(12) United States Patent
Gunasekara

(10) Patent No.: US 8,190,084 B1
(45) Date of Patent: May 29, 2012

(54) SYSTEMS AND METHODS OF COMMUNICATING BETWEEN SATELLITE AND TERRESTRIAL NETWORKS

(75) Inventor: Don Gunasekara, Reston, VA (US)

(73) Assignee: Nextel Communications Inc., Reston, VA (US)

( * ) Notice: Subject to any disclaimer, the term of this patent is extended or adjusted under 35 U.S.C. 154(b) by 916 days.

(21) Appl. No.: 12/170,485

(22) Filed: Jul. 10, 2008

(51) Int. Cl.
*H04B 7/185* (2006.01)
*H04W 4/00* (2009.01)
*H04W 40/00* (2009.01)

(52) U.S. Cl. ...... 455/12.1; 455/427; 455/13.1; 455/429; 455/428

(58) Field of Classification Search .................. 455/12.1, 455/13.1, 427, 428, 429
See application file for complete search history.

(56) References Cited

U.S. PATENT DOCUMENTS

| | | | |
|---|---|---|---|
| 5,216,427 A * | 6/1993 | Yan et al. ...................... | 342/352 |
| 6,240,124 B1 * | 5/2001 | Wiedeman et al. ........... | 375/130 |
| 6,272,316 B1 * | 8/2001 | Wiedeman et al. .......... | 455/13.1 |
| 6,738,363 B1 * | 5/2004 | Best et al. ..................... | 370/329 |
| 7,099,331 B2 * | 8/2006 | Taylor ...................... | 370/395.41 |
| 2003/0050015 A1 * | 3/2003 | Kelly et al. .................. | 455/67.4 |

* cited by examiner

*Primary Examiner* — Tilahun B Gesesse

(57) ABSTRACT

Systems and methods of supporting a communication session are provided. A first endpoint is authenticated with a terrestrial wireless communication network, wherein the first endpoint is in wireless communication with a satellite communication network. A quality of service is determined for communications exchanged between the first endpoint and a second endpoint supported by the terrestrial communication network. Communications are exchanged between the first and second endpoints in accordance with the determined quality of service.

13 Claims, 2 Drawing Sheets

SYSTEMS AND METHODS OF COMMUNICATING BETWEEN SATELLITE AND TERRESTRIAL NETWORKS

BACKGROUND OF THE INVENTION

Figure 1:
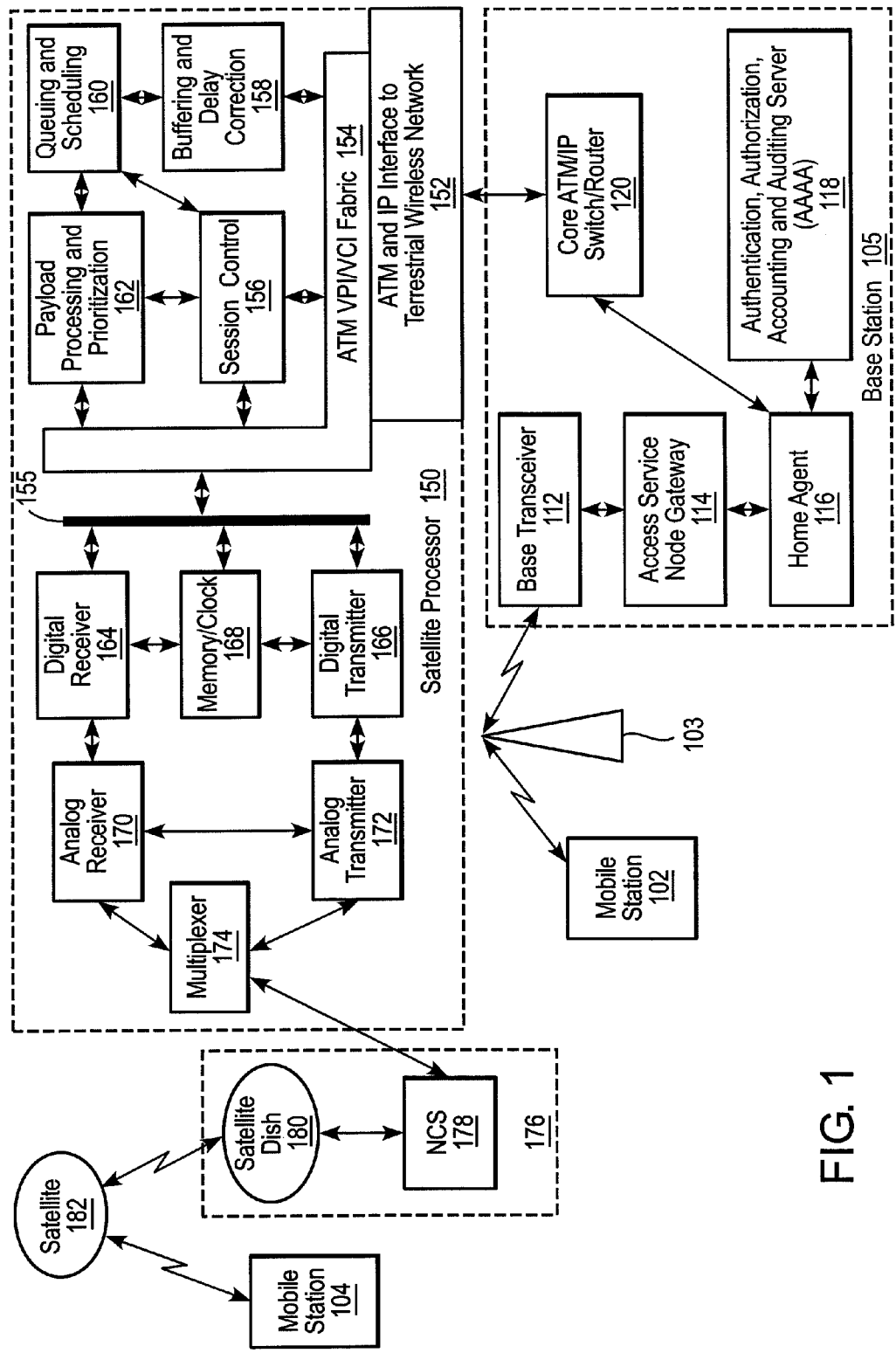

There are a variety of different types of communication networks, such as terrestrial-based wireless communication networks and satellite communication networks. Terrestrial-based wireless communication networks are commonly known as cellular networks because the network topology revolves around a number of base stations each supporting wireless communication units within a defined region known as a cell. Compared to terrestrial-based wireless communication networks, satellite communication networks have a large number of drawbacks, including the expense of the satellites and the associated handsets. An additional problem with satellite communication networks is the large latency associated with the time required for information to travel between a land-based communication device and the satellite. This delay is then repeated for the transmission of the communication from the satellite back down to another communication device. The delay introduced due to the satellite communication links begins on the order of 500 ms and can exceed 2,500 ms.

SUMMARY OF THE INVENTION

Current satellite communication networks do not provide quality of service mechanisms to account for delays and/or packet loss. Accordingly, exemplary embodiments of the present invention overcome the above-identified and other deficiencies of conventional systems.

Systems and methods of supporting a communication session are provided. A first endpoint is authenticated with a terrestrial wireless communication network, wherein the first endpoint is in wireless communication with a satellite communication network. A quality of service is determined for communications exchanged between the first endpoint and a second endpoint supported by the terrestrial communication network. Communications are exchanged between the first and second endpoints in accordance with the determined quality of service.

Other objects, advantages and novel features of the present invention will become apparent from the following detailed description of the invention when considered in conjunction with the accompanying drawings.

BRIEF DESCRIPTION OF THE DRAWING FIGURES

Figure 2:
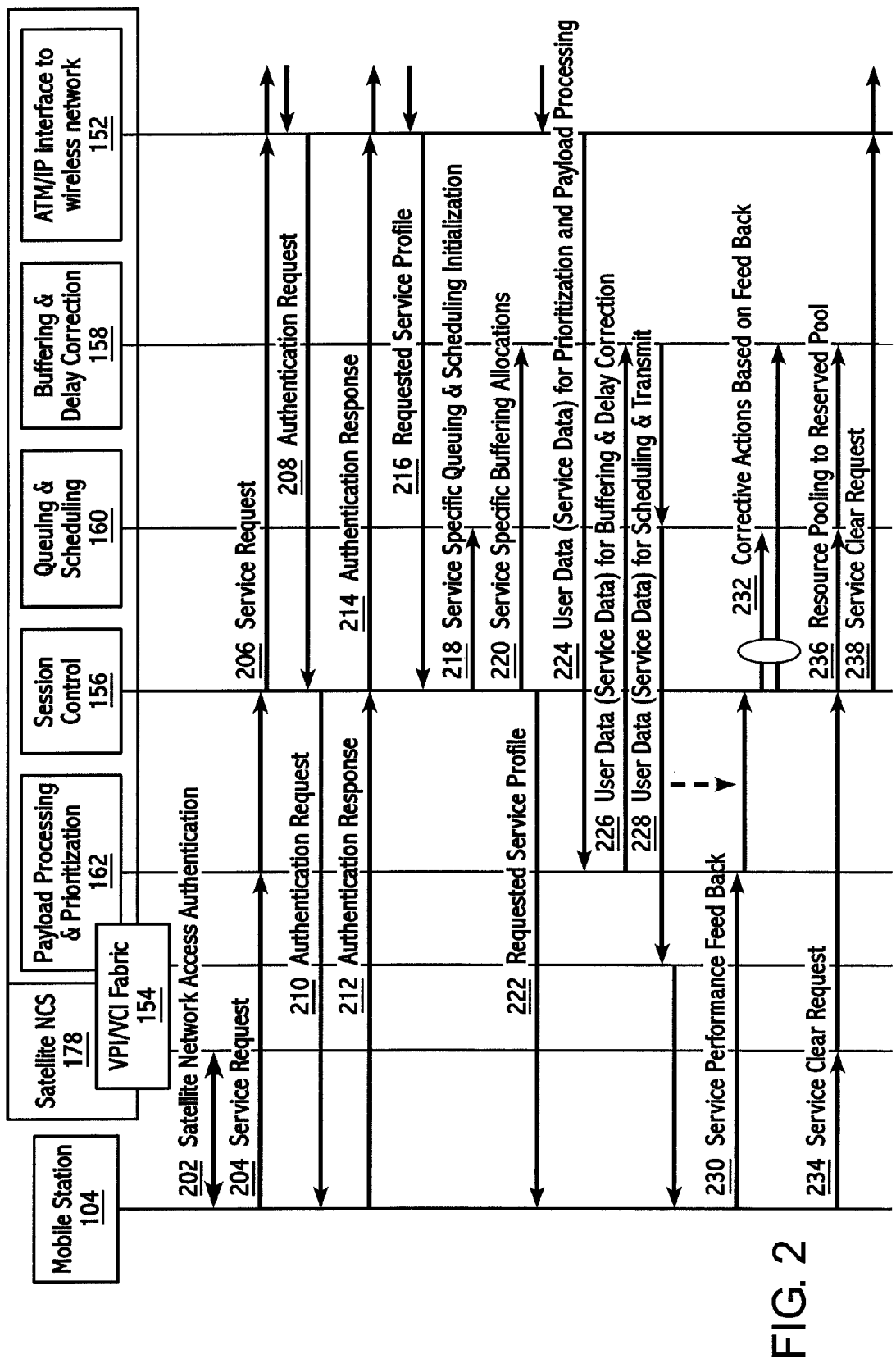

FIG. 1 is a block diagram of an exemplary system in accordance with the present invention; and FIG. 2 is a call flow diagram of an exemplary method in accordance with the present invention.

DETAILED DESCRIPTION OF THE PREFERRED EMBODIMENTS

FIG. 1 is a block diagram of an exemplary system in accordance with the present invention. The system of FIG. 1 allows mobile station 104, which is in wireless communication with a satellite communication network, to communicate with mobile station 102, which is in wireless communication with a terrestrial-based network (represented in FIG. 1 by base stations 103 and 105). The system can also provide digital video broadcasting to mobile station 104 via the satellite communication network.

The exemplary system includes satellite processor 150 coupled to a satellite communication network via satellite uplink component 176 and satellite 182. Satellite processor 150 is also coupled to a terrestrial-based wireless communication network that includes base stations 103 and 105. Satellite processor 150 provides advance internet protocol (IP) networking features, such as diversity routing and bandwidth, to support virtual private networks (VPNs) for mobile station 104 such that security can be provided for asynchronous transfer mode (ATM) packets of the satellite communication network.

Unlike a conventional base station, base station 105 includes an access service node gateway 114, home agent 116, authentication, authorization, accounting and auditing server (AAAA) 118 and core ATM/IP switch/router 120. Core ATM/IP switch/router 120 can employ a 10BaseT, 100BaseT or 10Base2 connection with interface 152 of satellite processor 150. Core ATM/IP switch/router 120 can provide rate adaptation for low-speed and high-speed traffic by using pre-assigned port IDs for the different rate traffic. Core ATM/IP switch/router 120 can include routing tables, that are automatically updated, for satellite to wireless routing protocols across the satellite communication network, and RIPV, OSPF or BGP across the terrestrial-based wireless communication network. Moreover, core ATM/IP switch/router 120 can provide satellite communication network to terrestrial-based wireless communication network subnet masking to allow for efficient use of IP addresses. Base transceiver 112 supports a wireless communication link between base station 105 and base station 103 of the terrestrial-based wireless communication network.

In the system of FIG. 1 communications in the satellite communication network are performed using ATM packets and communications in the terrestrial-based wireless communications network are performed using IP packets. Accordingly, satellite processor 150 is coupled to base station 105 by way of ATM and IP interface 152, which provides an interface between the IP-based terrestrial wireless communication network and the ATM-based satellite communication network. Interface 152 is coupled to ATM virtual path identifier/virtual channel identifier (VPI/VCI) fabric 154, which acts as a convergence sublayer for incoming IP traffic from the terrestrial-based wireless communication network for transmission over the ATM-based satellite communication network and for outgoing ATM traffic from the satellite communication network for transmission over the IP-based terrestrial wireless communication network. ATM VPI/VCI fabric 154 can perform VCI/VPI address insertion for traffic received from the terrestrial-based wireless communication network.

ATM VPI/VCI fabric 154 is coupled to session control module 156, buffering and delay correction module 158, queuing and scheduling module 160 and payload processing and prioritization module 162. Session control module 156 maintains a state event machine for establishment, maintenance and tearing down of connections. It dynamically changes the buffering and scheduling of packets based on channel conditions and feedback information received from applications running on the mobile station 104. Buffering and delay correction module 158 buffers incoming packets (and purges the oldest living packets that have not been forwarded) and performs delay correction to change the packet size based on service request and channel condition status. Queuing and scheduling module 160 adjusts the delay performance of the applications running on mobile station 104 based on commands received from session control module 156. For example, queuing and scheduling module 160 provides priority queuing management to support real time, non-real time and contention-based traffic.

Payload processing and prioritization module 162 processes incoming control plane packets, connection related signaling messages and user data from both the satellite and terrestrial-based wireless communication networks. Based on the service type request of a particular connection, payload processing and prioritization module 162 allocates the priority for each connection type.

Interface 152, fabric 154 and modules 156-162 can be application specific integrated circuits (ASICs), field programmable gate arrays (FPGAs) and/or microprocessors executing code embodied on a computer-readable medium. Fabric 154 couples these elements to bus 155, which in turn is coupled to digital receiver 164, digital transmitter 166 and memory/clock 168. Memory/clock 168 is also coupled to digital receiver 164 and digital transmitter 166, and can include any type of memory, such as RAM, ROM, and/or flash memory. The clock of element 168 acts as a master clock for digital transmitter and receiver 164 and 166 and fabric 154 (via bus 155). The memory of element 168 can store locally executable files. Digital receiver 164 is coupled to analog receiver 170, and digital transmitter 166 is coupled to analog transmitter 172. Analog receiver 170 and analog transmitter 172 are coupled to each other, and to multiplexer 174.

Multiplexer 174 couples satellite processor 150 to network coordination center (NCS) 178 of satellite uplink component 176. NCS 178 is in turn coupled to satellite dish 180 which communicates with a satellite-based network, represented in FIG. 1 by satellite 182. Satellite 182 then communicates with mobile station 104.

FIG. 2 is a call flow diagram of an exemplary method in accordance with the present invention. Initially, mobile station 104 performs satellite network access authentication with NCS 178 of the satellite network. After authentication with the satellite network, mobile station 104 sends a service request to payload processing and prioritization module 162, which forwards the message to session control module 156 (step 204). Session control module 156 forwards the service request to ATM/IP interface 152 (step 206), which then forwards the service request to base station 105. Base station 105 accesses information from AAAA server 118 and then sends an authentication request to interface 152, which in turn, sends the authentication request to session control module 156 (step 208).

Session control module 156 forwards the authentication request to mobile station 104 (step 210), which responds with an authentication response (step 212). Session control module 156 forwards the authentication response to interface 152 (step 214), which forwards the authentication response to base station 105. Base station 105 authenticates the mobile station using AAAA server 118, accesses a service profile for the mobile station from home agent 116, and provides interface 152 with the requested service profile. Interface 152 forwards the service profile to session control module 156 (step 216). Service control module 156 uses the service profile to provide quality of service for the mobile station supported by the satellite communication network.

Session control module 156, based on the requested service profile, sends service specific queuing and scheduling initialization information to queuing and scheduling module 160 (step 218). Session control module 156, based on the requested service profile, sends service specific buffering allocations to buffering and delay correction module 158 (step 220). Session control module 156 then forwards the requested service profile to mobile station 104 (step 222).

When interface 152 receives user data for mobile station 104, the interface sends the user data to payload processing and prioritization module 162 (step 224), which then sends the user data to buffering and delay correction module 158 (step 226). Based on the service profile, buffering and delay correction module 158 sends the user data to fabric 154 (step 228), which forwards the user data to mobile station 104. This process will be repeated for all user data transmitted to mobile station 104.

Based upon the received user data, mobile station 104 sends service performance feedback information (step 230) to payload processing and prioritization module 162, which forwards the information to session control module 156. Session control module 156, based upon the service profile and service performance feedback information, provides corrective actions to queuing and scheduling module 160 and buffering and delay correction module 158 (step 232).

When mobile station 104 desires to terminate the communication, the mobile station sends a service clear request to session control module 156 (step 234), which then informs buffering and delay correction module 158 of the service clear request (step 236) and forwards the information to fabric 152 (step 238), which then informs base station 105 of the clear request.

As can be seen from the discussion above, exemplary embodiments of the present invention provide for on-demand service provisioning and end-to-end Quality of Service (QoS) for mobile stations in wireless communication with a satellite communication network, which increases end-user satisfaction.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of supporting a communication session comprising the acts of:
   authenticating a first endpoint with a terrestrial wireless communication network, wherein the first endpoint is in wireless communication with a satellite communication network;
   determining a quality of service for communications exchanged between the first endpoint and a second endpoint supported by the terrestrial communication network;
   exchanging communications, in accordance with the determined quality of service, between the first and second endpoints, wherein the exchange of communications comprises queuing and scheduling the exchanged communications based on the determined quality of service;
   receiving service performance feedback from the first endpoint; and
   adjusting the queuing and scheduling based on the received service performance feedback to conform with the determined quality of service.

2. The method of claim 1, wherein the quality of service is based on a service profile, the method further comprising the act of:
   obtaining, by a component of the satellite communication network, the service profile.

3. The method of claim 2, wherein the service profile is associated with the first endpoint.

4. The method of claim 1, wherein communications are provided to the first endpoint using Asynchronous Transfer Mode (ATM) cells.

5. The method of claim 4, wherein the communications are provided to the second endpoint in Internet Protocol (IP) packets.

6. A system of supporting a communication session comprising:
- a satellite communication network;
- a terrestrial-based wireless communication network;
- a satellite processor coupled to the satellite communication network; and
- a base station coupled to the satellite processor and the terrestrial-based wireless communication network,
- wherein the base station includes an authentication module that authenticates a first endpoint with a terrestrial wireless communication network, wherein the first endpoint is in wireless communication with a satellite communication network,
- wherein the satellite processor includes a session control module that determines a quality of service for communications exchanged between the first endpoint and a second endpoint supported by the terrestrial communication network and controls communications exchanged between the first and second endpoints in accordance with the determined quality of service,
- wherein the satellite processor includes a queuing and scheduling module that queues and schedules the exchanged communications based on the determined quality of service, and
- wherein the session control module receives service performance feedback from the first endpoint, and sends a message to the queuing and scheduling module to adjust the queuing and scheduling based on the received service performance feedback to conform with the determined quality of service.

7. The system of claim 6, wherein the satellite processor includes a buffering and delay correction module that buffers and performs delay correction based on the determined quality of service.

8. The system of claim 7, wherein the session control module receives service performance feedback from the first endpoint, and sends a message to the buffering and delay correction module to adjust the buffering and delay correction based on the received service performance feedback to conform with the determined quality of service.

9. The system of claim 6, wherein the quality of service is based on a service profile that is obtained by the session control module.

10. The system of claim 9, wherein the service profile is associated with the first endpoint.

11. The system of claim 6, wherein communications are provided to the first endpoint using Asynchronous Transfer Mode (ATM) cells.

12. The system of claim 11, wherein the communications are provided to the second endpoint in Internet Protocol (IP) packets.

13. A method of supporting a communication session comprising the acts of:
- authenticating a first endpoint with a terrestrial wireless communication network, wherein the first endpoint is in wireless communication with a satellite communication network;
- determining a quality of service for communications exchanged between the first endpoint and a second endpoint supported by the terrestrial communication network;
- exchanging communications, in accordance with the determined quality of service, between the first and second endpoints, wherein the exchange of communications comprises buffering and delay correction based on the determined quality of service;
- receiving service performance feedback from the first endpoint; and
- adjusting the buffering and delay correction based on the received service performance feedback to conform with the determined quality of service.

* * * * *